Sept. 20, 1971     A. SERAGNOLI     3,605,517
IMMEDIATE LOCKING OR STALLING GENEVA WHEEL DEVICE HAVING
A HIGH POSITIONING DEGREE OR INDEX FOR THE INTERMITTENT
MEMBER BY A PLURALITY OF LOCKING OR STALLING
PARTS (CENTERING ELEMENTS)
Filed July 17, 1969                    3 Sheets-Sheet 1
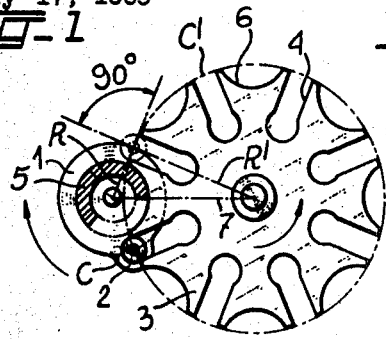
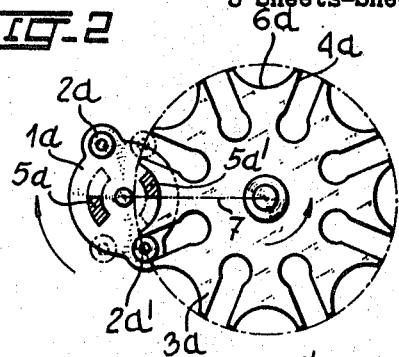
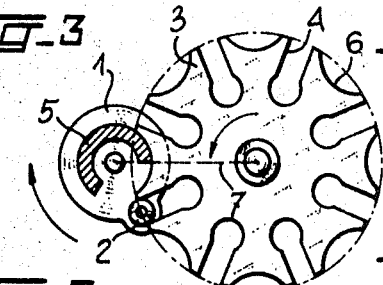
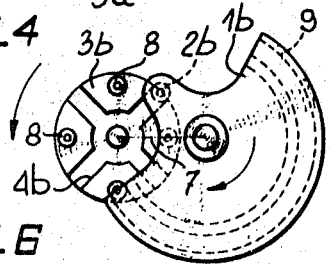
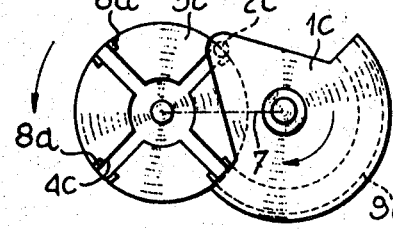
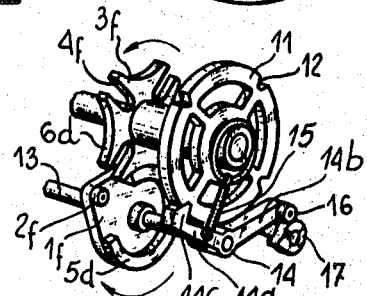
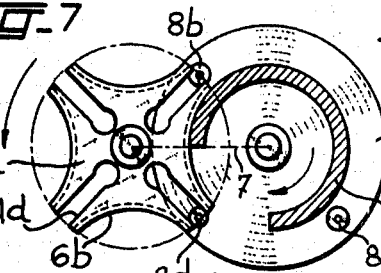
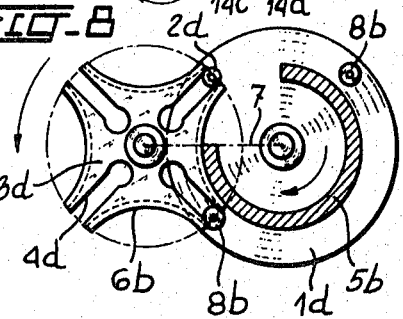
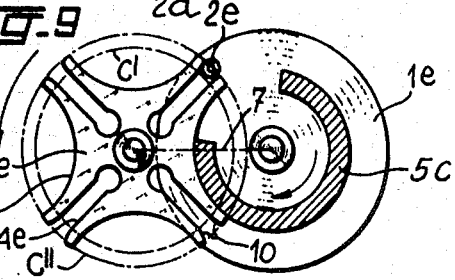

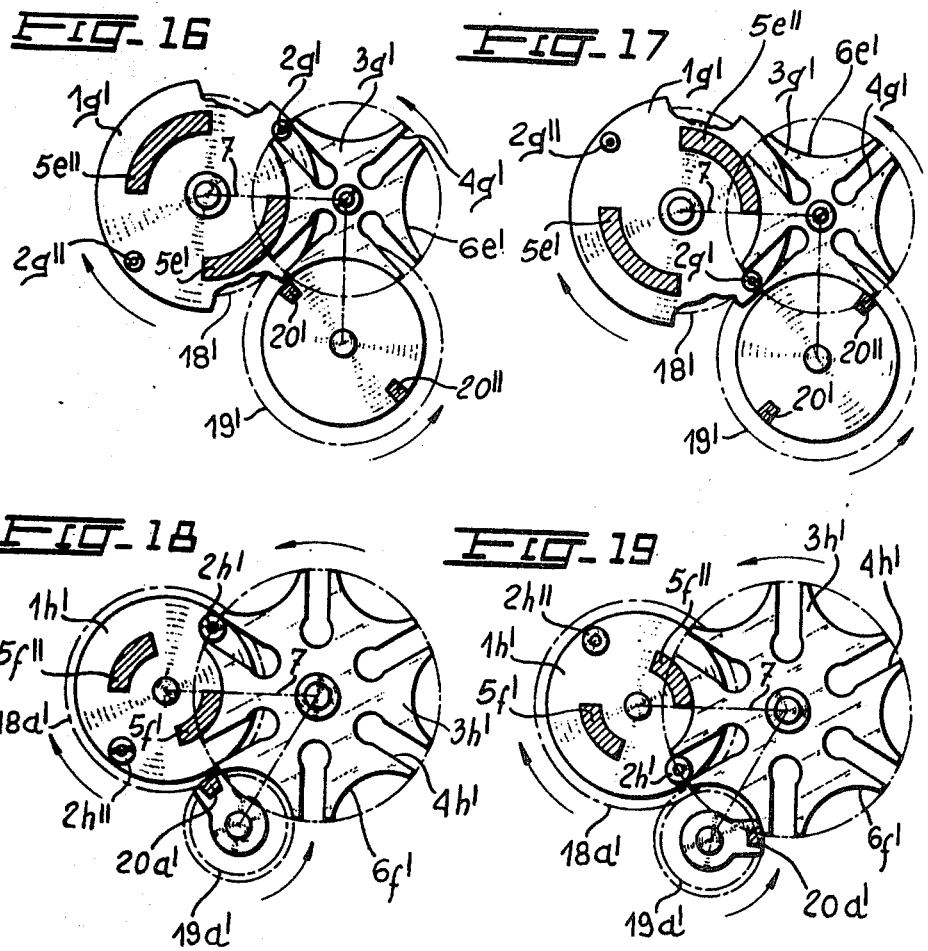

United States Patent Office 3,605,517
Patented Sept. 20, 1971

3,605,517
IMMEDIATE LOCKING OR STALLING GENEVA WHEEL DEVICE HAVING A HIGH POSITIONING DEGREE OR INDEX FOR THE INTERMITTENT MEMBER BY A PLURALITY OF LOCKING OR STALLING PARTS (CENTERING ELEMENTS)
Ariosto Seragnoli, Bologna, Italy, assignor to G.D. Societa in Accomandita Semplice di Enzo Seragnolie, Bologna, Italy
Filed July 17, 1969, Ser. No. 842,573
Int. Cl. F16h 55/04; B23b 29/24
U.S. Cl. 74—436                    3 Claims

ABSTRACT OF THE DISCLOSURE

A Geneva wheel device comprises an evenly rotating driving wheel and a Geneva or driven wheel having radial spaces and being intermittently rotated by one or by each of a plurality of associated operating rollers, eccentrically angularly spaced apart with respect to said driving wheel. One or more cylindrical surface projections concentric (centering element) therewith and intended to co-operate with one of the concave surfaces conjugated thereto on the Geneva wheel periphery between one space and the other are provided. Said operating roller(s) are associated with the driving wheel so as to enter the corresponding radial space at the intersection between the paths as described by the respective circumferential travel and that of the terminal ends of said Geneva wheel, the corresponding radial forming with the median radial of said entering space an angle less than 90°. There is provided a moving member having at least one auxiliary cylindrical surface (centering element) conjugable with the peripheral concave surfaces of the Geneva or driven wheel, this moving member being moved in timed relationship with the movements of the driving wheel to bring said auxiliary cylindrical surface to co-operate with a corresponding conjugate concave surface of said driven wheel so as to lock or stop it at the position being reached at the time the operating roller associated with said driving wheel leaves its corresponding radial space.

---

Figure 10:
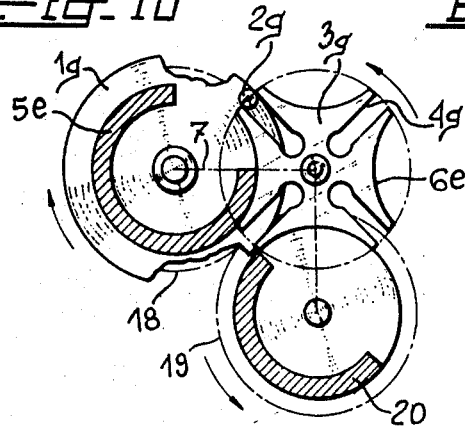

This invention relates to Geneva wheel devices developing, as well known, an intermittent or stepping rotational movement, and more particularly an immediate locking or stalling device of this type having a high positioning degree or index for the intermittent member by a plurality of locking or stalling parts (centering elements). Such devices are applicable for example to tool machine and automatic manufacturing, conditioning, packaging, wrapping up, over wrapping up machine and the like for various products, such as alimentary, confectionary, pharmaceutical, chemical, cosmetic, tobacco products and the like.

As well known, Geneva wheel devices developing an intermittent or stepping rotational movement, generally for a shaft about its axis, substantially comprise a member normally rotating by uniform continuous movement about its own axis and eccentrically provided with one or more elements, usually comprising a corresponding idle roller, each of which is designed for subsequently engagement within one of a plurality of radial notches, commonly referred to as spaces, presented by a second member, referred to as Geneva wheel, which is thus driven by intermittent or stepping rotational movement about its own axis.

For the sake of brevity and clearness, the above members, i.e. the member provided with an eccentric idle roller and the member provided with radial spaces or Geneva wheel, will be referred to in the following description as the driving wheel and driven wheel, respectively, whereas the eccentric idle roller for the driving wheel will be referred to as the operating roller for the driven wheel and sometimes even more simply as operating roller.

FIGS. 1 to 9 are schematic elevation views of known Geneva mechanisms; and

FIGS. 10 through 19 inclusive are schematic elevation views of different embodiments of Geneva mechanism according to the present invention.

For the sake of clarity, known Geneva wheel devices will now be described with reference to FIGS. 1–9 of the accompanying drawings.

In order to achieve a starting from inoperative or idling condition and to control the full angular excursion for the individual intermittences of the driven wheel by gradual movement, the operating roller is associated with the corresponding driving wheel so that at the time of entering the corresponding space of said driven wheel, its centre of rotation is substantially at the intersecting location between circumferences C–C′, as described during the rotational movements thereof by the centre of rotation itself for said operating roller, and the terminal ends of the driven wheel, or Geneva wheel, and where the radials R–R′ for the driven and driving wheels will intersect, forming an angle at 90°, passing through the centre of said operating roller and centre line, respectively, for the space of the driven wheel which is being entered by said operating roller, as seen by the exemplary diagrams in FIGS. 1 and 2 of the accompanying drawings and referred to a driving wheel 1–1a having one and two operating rollers 2, 2a–2a′, respectively, and a corresponding driven wheel 3–3a having eight radial spaces 4–4a.

The driving wheel 1–1a is also contemplated as provided with one or more projections 5, 5a–5a′ having a cylindrical surface concentric therewith (centering element) and such a section or angular extension as to enable the rotational movement for the driven or Geneva wheel 3–3a when the operating roller 2, 2a–2a′ engages within a space 4–4a thereof, and to prevent it when said operating roller 2, 2a–2a′ disengages from Geneva wheel 3–3a and goes on through its rotational movement to engage the next space 4–4a by said cylindrical surface of said projection(s) 5, 5a–5a′ slidingly contacting one of the conjugate concave surfaces 6–6a on the periphery of Geneva wheel 3–3a between one another spaces thereof 4–4a.

The angular extension of the cylindrical surface (centering element) for said projection(s) 5, 5a–5a′, enabling the rotational movement for driven wheel 3–3a when operating roller 2, 2a–2a′ engaging within a space 4–4a thereof, is such that at the time when said operating roller 2, 2a–2a′ leaves the corresponding engaged space, said cylindrical surface is slidingly contacting the corresponding conjugate surface 6–6a of driven wheel 3–3a for a length of penetration in the direction of rotation (FIG. 3) arriving about at right line 7 passing through the centres of rotation for said two driving and driven wheels 1–1a and 3–3a, respectively.

Thus, it is apparent (FIG. 3) that at that time said driven wheel 3–3a is completely free, thereby being subjected to the so-called "lash" or kick, since that portion of the cylindrical surface (centering element) of the associated projection 5, 5a–5a′, as entered by slidingly contacting its corresponding conjugate surface 6–6a, of said driven wheel 3–3a, cannot yet provide for any reaction bearing to the resulting back rotation of the driven wheel, subsequent to the end of the rotation driving operation, since said cylindrical surface has not yet gone beyond said right line 7.

As a result of the foregoing, that is to say firstly because of the so-called "lash" which, as known, is due to the succession of blows and kicks of the driven wheel, and more particularly and proportionally to the respective law of movement, when the axis or shaft for said driven wheel is associated with members to be intermittently rotated and having significant dimensions and weight, as when automatic and semi-automatic machines are concerned, such as general tool machines and automatic manufacturing, conditioning, packaging, wrapping up, over wrapping up machines and the like for various products, such as alimentary, confectionary, pharmaceutical, chemical, cosmetic, tobacco products and the like, that vibratory or resonant phenomenon is provided which, in the particular art is known and referred to as jolting or moving machine, which is the major ground for the substantial wear of the members being involved and resulting frequent replacements thereof along with an associated high running cost of the machine and limited operating speeds providing such a machine with a low flexibility and uneconomical from this standpoint.

In order to overcome the above-mentioned drawbacks, many expedients of a more or less complicated construction have been devised which, however, are based on the functional principle of assigning a highly restricted surface for relieving the reaction forces subsequent to the succession of "steering" blows and kicks developing on the driven wheel at the completion of the angular excursion for the individual intermittences, this surface being normally practically a generatrix of a roller, as seen from the most significant examples shown in FIGS. 4, 5, 7, 8 and 9 of the accompanying drawings, or of an even more complicated and expensive construction and operation, as seen in FIG. 6 of the accompanying drawings.

Thus, in the embodiment according to the example shown in said FIG. 4, it can be seen that an auxiliary idle roller 8 is associated with the driven wheel 3b between each pair comprising subsequent radial spaces 4b and at an equally spaced apart position, while the driving wheel 1b, provided with the operating roller 2b for said driven wheel 3b is so shaped as to have on its face facing said driven wheel 3b a circular groove 9, the average radius of which being the same as the diametral spacing between the centres of rotation for the two diametrically opposing auxiliary rollers 8 associated with said driven wheel 3b.

Thus, at the time when the operating roller 2b leaves the corresponding space 4b previously entered due to the intermittent movement of the driven wheel 3b, the circular groove 9 for the driving wheel 1b will enter an auxiliary roller 8 of said driven wheel 3b, whereby the forces resulting from the succession of the "lash" blows and kicks, as developed by the cessation of the driven rotation of the driven wheel 3b by the operating roller 2b, will be relieved on a generatric of said auxiliary roller 8, subsequently adding to the above-mentioned drawbacks. A further drawback resulting from such a structure resides in its inherent use restriction which, as readily seen, resides in that said driven wheel 3b has necessarily to be associated at the head, or at a cantilevered end of the corresponding shaft.

An alternate embodiment to that according to FIG. 4, as designed for overcoming the above drawback in inherent use restriction, is shown in the example in FIG. 5. According to this alternative, the auxiliary rollers 8 associated with driven wheel 3b are replaced by auxiliary members 8a associated with driven wheel 3c at the terminal end of radial spaces 4c, while the average radius for the circular groove 9a of driving wheel 1c is the same as the radial spacing between the axis of rotation for said driving wheel 1c and the centre of rotation of its associated idle operating roller 2c for said driven wheel 3c.

Said auxiliary members 8a may comprise idle rollers and, in such an event, apart from the difficulties of practical executive nature for carrying out such a structure, the drawback still remains however as related to reaction force relieving, or, as shown in the figures, they may comprise arcuate surface ears, so as to be entered by groove 9a and to mate the contour thereof during the interengaging movement. Also in this latter case, it is quite apparent that said drawback remains as related to reaction force relieving, a further drawback being also added thereto, because of the subsequent sliding contact between the ear surfaces and those for the side walls of said groove 9a.

In the example of the device as shown in FIGS. 7 and 8, according to a further attempt for solving the above problem, on the diameter normal to the radius along which the operating roller 2d for the driving wheel 1d is associated, and at a respective distance from the centre of rotation of said driving wheel 1d, which is the same as the distance from said centre of rotation for said operating roller 2d, the auxiliary rollers 8b are provided, the diameter of which being larger than that of said operating roller 2d, but having a lesser height so as to be entered at the terminal end of spaces 4d of driven wheel 3d, between the raised edges along the conjugate concave surfaces 6b thereof to said driving wheel 1d and to pass below said driven wheel 3d.

From FIG. 7, showing the instant at which the operating roller 2d is just going to enter a space 4d for movement of the corresponding intermittence for driven wheel 3d, and from FIG. 8, showing the instant at which said operating roller 2d is just going to leave said space 4d at movement completion for the respective intermittence, as will be readily seen the occurrence of the above-mentioned drawback in reaction force relieving on a generatrix of auxiliary roller 8b and as, in practice, a high degree of accuracy is required in piece machining and assembling, the locking for driven wheel 3d being allotted to the joint of a terminal end thereof between said auxiliary roller 8b and the cylindrical surface of projection 5b of driven wheel 1d (FIG. 8).

In a further attempt to solve this problem, as shown by the diagram for the device according to FIG. 9, it has been suggested to increase the diameter of the driven wheel 3e, or the circumference C'' as described by its terminal ends during the rotation thereof with respect to the diameter as conventionally adopted and above defined in connection with FIG. 1, and to provide at such resulting terminal ends for an emphasized guideway 10 on the side of the surface for the corresponding space 4e so as to enable the operating roller 2e of the driving wheel 1e to enter and leave, respectively in advance and with delay, and to enable the cylindrical surface of projection 5e cooperating with the conjugate concave surfaces 6e to pass beyond the right line 7 passing through the centres of rotation for the driving wheel 1e and driven wheel 3e.

From the foregoing description in connection with FIG. 1 relating to the construction of these Geneva wheels devices, the experience resulting from the construction and practical operation thereof, as well as from the exemplary diagram shown in FIG. 9, it will be noted that the diameter increase for the driven wheel 3 cannot exceed certain limits, whereby, as a consequence, also the penetration of projection 5c on the driving wheel 1e beyond the right line 7 is somewhat limited and however such, owing to the direction of penetration thereof (FIG. 9), as not to avoid relative movements between its cylindrical surface and the corresponding conjugate concave surface 6c of the driven wheel 3e as a consequence of the blows and kicks being developed by the "lash" ensuing from the operating roller coming out of the corresponding space.

The approach being proposed by the device according to FIG. 6 and consisting, as above stated, of a highly complicated and expensive structure, provides instead a fly-wheel member 11 to be associated with the shaft of the driven wheel 3f and rotated therewith, on its periphery this fly-wheel 1 member 11 being provided with notches or recesses 12 in a number equal to that of spaces 4f presented by said driven wheel 3f. The driving wheel 1f, which is fitted with an operating roller 2f and cylindrical surface projection 5d, intended to co-operate as usual, respectively, with spaces 4f and conjugate concave surfaces 6d of the driven wheel 3f, idly carries on its shaft 13 a lever 14 having two arms 14a 14b, the arm 14a of which being at its free end shaped as a nib 14c for engaging under the action of the return spring 15 within one of said notches or recesses 12 on fly-wheel 11 when operating roller 2f leaves space 4f, thus locking the driven wheel 3f at movement completion of each intermittence, and arm 14b provided with a follower roller 16 co-operating with timing cam 17 for causing said lever 14 to oscillate against the action of said return spring 15, removing said nib 14c from the associated notch or recess 12 when said operating roller 2f is about to enter the next space 4f for the movement of the next intermittence of said driven wheel 3f. It is the object of the present invention to provide a Geneva wheel capable of completely avoiding all of the above drawbacks by a structure prevailing based upon the functional scheme of conventional Geneva wheel devices, but such as to achieve an immediate locking with a high positioning degree or index for the driven wheel and such as to attain higher rotational speeds as well.

Another object of the present invention further resides in enabling to achieve the former object in a substantially easy manner, reliability in use, efficient and durable operation, and also and above all through a very economical manufacturing cost in view of the performances and results provided thereby.

Substantially, a conventional Geneva wheel device, that is a Geneva wheel device involving a mainly evenly moving driving wheel and a driven wheel or Geneva wheel having radial spaces and being intermittently moved by means of one or more operating rollers associated with said driving wheel, is rendered adapted to achieve the abovementioned objects, solving the problem as found in practically applying these known devices with the occurrence of the afore-cited drawbacks, so that at the time the operating roller associated with the driving wheel leaves the corresponding radial space of the driven wheel for the respective intermittent movement, a large auxiliary conjugate surface (centering element) will be combined with said driven wheel, and preferably with one of the peripheral concave surfaces thereof conjugable with the cylindrical surface of the projection (centering element) associated with the driving wheel, this large auxiliary conjugate surface being adapted to immediately stop any back rotation of said driven wheel due to the "lash" ensuing from the cessation of the intermittent movement, thus avoiding the succession of blows and kicks and relieving the forces of the corresponding reaction on a large resisting surface with evident imaginable remarkable advantages.

In order to practically carry out said immediate locking of the driven wheel, we started from the abovementioned principle contemplating the increase in diameter of the driven wheel, or the increase in the circumference being described during the rotation of the terminal ends thereof, so as to enable the operating roller, by taking advantage of the normal existing clearances, to enter and leave the corresponding radial engaging space of said driven wheel, respectively in advance and with delay, and operating so that said auxiliary cylindrical surface is brought into operative resisting relationship with one of the conjugate concave surfaces of the driven wheel, in advance with respect to the resisting action of the normal cylindrical surface co-operating with the associated conjugate concave surface of the driven wheel which, as above noted, is unfit for resisting the back rotational movement, or to avoid the "lash" of said driven wheel.

Such a Geneva wheel device, or a Geneva wheel device essentially comprising an evenly rotating driving wheel and a driven wheel, or Geneva wheel, having radial spaces and intermittently rotated by one, or in a sequence, by each of a plurality of operating rollers eccentrically angularly spaced apart and associated with said driving wheel, in combination with said driving wheel there being provided one or more projections having a cylindrical surface concentric therewith (centering element) and intended to co-operate with one of the concave surfaces conjugated thereto on the Geneva wheel periphery between one space and the other, and said operating roller(s) being associated with the driving wheel so as to enter the corresponding radial space at the intersection between the paths as described by the respective circumferential travel and by that of the terminal ends for said Geneva wheel, and wherein the corresponding radial forms with the median radial of said entering space an angle lower than 90°, is therefore characterised according to the present invention by comprising a moving member having at least one auxiliary cylindrical surface (centering element) conjugable with the peripheral concave surfaces of the Geneva or driven wheel, said moving member being moved in timed relationship with the movement of the driven wheel for causing said auxiliary cylindrical surface to co-operate with a corresponding conjugate concave surface of said driven wheel so as to lock or stop it at the position being reached at the time the operating roller associated with said driving wheel leaves its corresponding radial space.

Further features and advantages will be more apparent from the following detailed description of some preferred, but not exclusive embodiments of the Geneva wheel device according to the invention and known Geneva wheel devices, shown by mere way of example and not in a limiting sense in the accompanying drawings, in which:

FIGS. 1–9 show, as above stated, constructive examples for the conventional Geneva wheel device and some known approaches for avoiding the Geneva or driven wheel "lash"; while FIGS. 10 and 11, 12 and 13, 14 and 15, 16 and 17, 18 and 19 show exemplary embodiments of Geneva wheel devices for immediately locking or stopping the driven wheel according to the invention.

Figure 11:
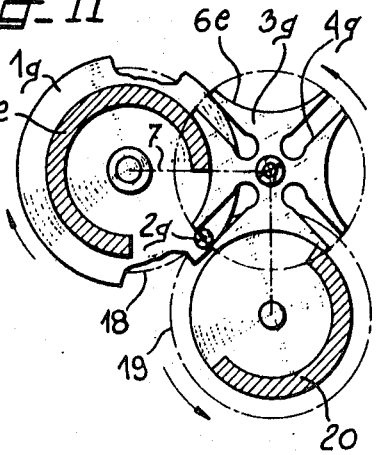

Therefore, referring to FIGS. 10–19, wherein like or equivalent members are designated by like reference numerals, but having a distinctive index for the different examples shown, from the embodiment in FIGS. 10 and 11, showing a Geneva wheel device with a driven wheel having four radial spaces, it will be seen that the driving wheel is designated by 1g and the operating roller and cylindrical surface projection associated therewith are designated by 2g and 5e, respectively, whereas the driven wheel is designated by 3g and its radial spaces and related conjugate concave surfaces are designated by 4g and 6e, respectively.

In order to achieve the immediate lock or stop according to the invention for the driven wheel of such a conventional device at the time the operating roller 2g leaves the space 4g for the corresponding intermittent movement of said driven wheel 3g (FIG. 11), on the shaft of driving wheel 1g there is keyed a gear wheel 18 meshing with a gear wheel 19. This gear wheel 19 is associated with an auxiliary cylindrical surface 20 concentric therewith and conjugate with respect to the peripheral concave surfaces 6e of driven wheel 3g.

The angular extension of this auxiliary cylindrical surface 20 and its timing relationship with the driving wheel 1g and accordingly with the driven wheel 3g are such that, at the time the operating roller 2g enters the radial space 4g of driven wheel 3g, it will not engage any conjugate concave surfaces 6e of driven wheel 3g so as to enable the latter to be intermittently rotated by said operating roller 2g (FIG. 10), while at the time said operating roller 2g leaves said space 4g, it will have already engaged for some length (FIG. 11) a corresponding conjugate concave surface 6e to resist the back rotation of driven wheel 3g, providing a large resisting surface against the "lash" with a substantial reduction in reaction loads for surface unit.

Figure 12:
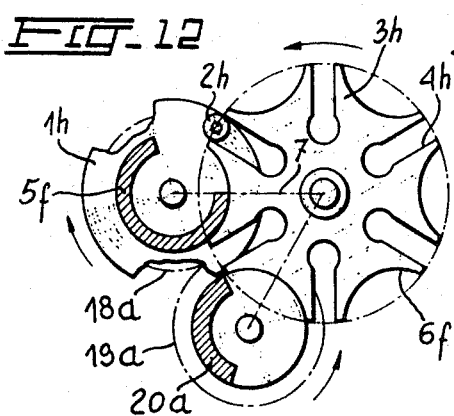
Figure 13:
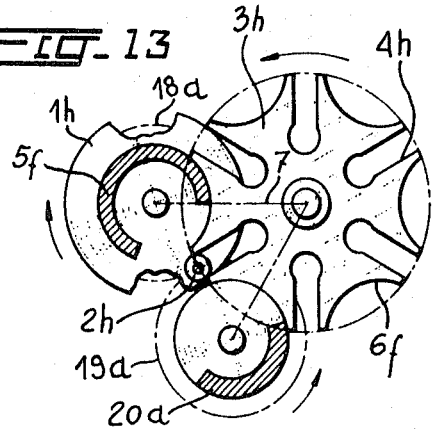

The embodiment shown in FIGS. 12 and 13 relates to a Geneva wheel device according to the invention for a driven wheel having six radial spaces. In this embodiment the driving wheel is designated by 1h and the operating roller and cylindrical surface projection are designated by 2h and 5f, respectively. The driven wheel which, as above stated, has six radial spaces 4h, is designated by 3h, while the respective conjugate concave surfaces are designated by 6f.

The gear which is keyed on the shaft of driving wheel 1h is designated instead by 18a, whereas the gear always meshing with it is designated by 19a. An auxiliary cylindrical surface 20a is associated with said gear 19a.

From FIGS. 12 and 13, showing the time said operating roller 2h enters a radial space 4h and leaves the same, respectively, the function of the above described auxiliary cylindrical suface 20a is clearly seen.

Figure 14:
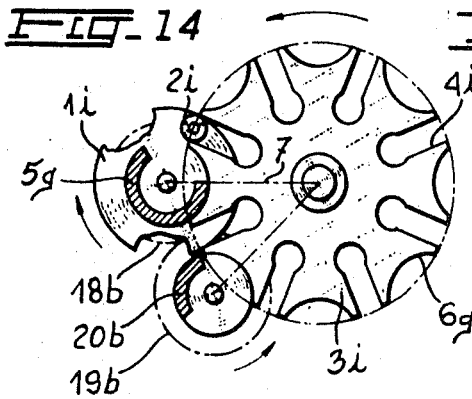
Figure 15:
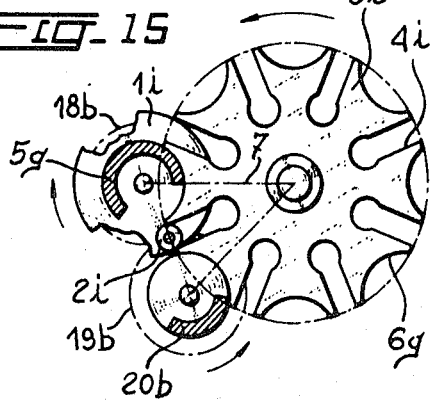

Instead, the Geneva wheel device shown in FIGS. 14 and 15 is provided for a driven wheel having eight radial spaces and the individual constituting elements are designated by the same numerals indicating the corresponding elements of the previously described embodiments, however followed by an index comprising the alphabetic letter next to that formerly used.

Instead, in FIGS. 16–17, and 18–19 there are shown two examples for the subject device, wherein the driven wheel has four and six radial spaces, respectively, and the driving wheel is provided with two operating rollers, instead of only one.

The elements making up these devices are designated by the same reference numerals used for indicating the elements making up the devices above described in connection with FIGS. 10–11 and 12–13, but followed by a distinctive index both for said elements and those being added.

Thus, for example, for the embodiment according to FIGS. 16 and 17, the driving wheel is designated by 1g', the operating rollers by 2g' and 2g'', the cylindrical surface projections by 5e' and 5e'', the driven wheel 3g', their radial spaces thereof by 4g', the conjugate concave surfaces thereof by 6e', the gear associated with the driving wheel by 18', the other gear by 19', and the auxiliary cylindrical surfaces by 20' and 20''.

The same designating criteria have been used in indicating the elements for the device according to FIGS. 18 and 19 in relation with the embodiment in FIGS. 12 and 13.

In practice, it was found that the dual centering Geneva wheel device according to the invention perfectly achieves all of the intended objects.

Particularly, this device provides the advantage of enabling the immediate lock or stop with a high positioning degree or index of the driven wheel at each intermittent movement thereof, relieving the reaction forces on a large resisting surface, thus substantially reducing the loads per surface unit.

A further advantage resulting from the device structure according to the invention resides in that, owing to the provision of a large resisting surface to the back rotation of the driven wheel, it is now possible to operate these elements with a correct lubrication thereof, which enables high operating speeds without any prejudicial effects due to a lack thereof, as is normally the case.

This device can be applied on all of those machines requiring the conversion of uniform rotary motions into intermittent motions, and particularly in the type of automatic and semi-automatic machines and for the above-mentioned uses.

The invention as devised is obviously susceptible of many modifications and changes, all of which within the scope of the invention; furthermore, all of the details may be replaced by other technically equivalent elements.

What is claimed is:

1. In a Geneva mechanism, in combination, a rotatably driven wheel having a plurality of slots extending inwardly from the periphery of the driven wheel and disposed angularly and evenly spaced thereon, said driven wheel having concave peripheral surfaces spaced peripherally on the driven wheel, each concave surface being disposed intermediate next-adjacent slots, a driving wheel for intermittently driving the driven wheel, an operating roller driving the driven wheel and mounted eccentrically relative to the driving wheel for rotation with the driving wheel and mounted for entry into and out of the slots of the driven wheel during rotation of the driving wheel, means defining a cylindrical surface engageable with the concave surfaces successively, said cylindrical surface being disposed coaxially with said driving wheel and having a convex curvature corresponding to the curvature of the concave surfaces for engaging smoothly the concave surfaces, and means to drive said means having the cylindrical surface in timed relationship with the rotation of the driving wheel to engage the cylindrical surface with the individual concave surfaces successively to effectively stop rotation of the intermittently driven wheel when said operating roller leaves each slot, whereby the driven wheel is smoothly indexed and stopped and is accurately positioned at different positions.

2. In a Geneva mechanism according to claim 1, in which said means defining said cylindrical surface is mounted on said driving wheel.

3. In a Geneva mechanism according to claim 1, in which said means defining said means defining said cylindrical surface comprises a wheel, and in which said means driving said means defining said cylindrical surface comprises gear means for driving the last-mentioned wheel from said driving wheel in the same direction of rotation as the rotation of said driving wheel.

References Cited

UNITED STATES PATENTS

| 2,589,486 | 3/1952 | Emrick | 74—820(UX) |
|-----------|--------|--------|------------|
| 2,789,441 | 4/1957 | Thorburn | 74—436 |
| 3,234,819 | 2/1966 | Zuse | 74—665 |
| 3,248,953 | 5/1966 | Holper et al. | 74—10.15 |
| 3,485,965 | 12/1969 | Bleibtreu et al. | 74—436X |
| 3,390,757 | 7/1968 | Edwards et al. | 74—820X |

LEONARD H. GERIN, Primary Examiner

U.S. Cl. X.R.

74—820